(12) United States Patent
Stucchi et al.

(10) Patent No.: US 10,151,221 B2
(45) Date of Patent: Dec. 11, 2018

(54) SYSTEM AND METHOD FOR VARIABLE ACTUATION OF A VALVE OF AN INTERNALCOMBUSTION ENGINE, WITH AN ELECTRICALLY OPERATED CONTROL VALVE HAVING AN IMPROVED CONTROL

(71) Applicant: C.R.F. Societa Consortile per Azioni, Orbassano (Turin) (IT)

(72) Inventors: Sergio Stucchi, Valenzano (IT); Raffaele Ricco, Casamassima (IT); Marcello Gargano, Torre a Mare (IT); Onofrio De Michele, Castellana Grotte (IT); Chiara Altamura, Taranto (IT); Domenico Lepore, Casamassima (IT)

(73) Assignee: C.R.F. SOCIETA CONSORTILE PER AZIONI, Orbassano (Turin) (IT)

( * ) Notice: Subject to any disclaimer, the term of this patent is extended or adjusted under 35 U.S.C. 154(b) by 41 days.

(21) Appl. No.: 15/366,727

(22) Filed: Dec. 1, 2016

(65) Prior Publication Data

US 2017/0175592 A1    Jun. 22, 2017

(30) Foreign Application Priority Data

Dec. 17, 2015  (EP) .................................... 15200888

(51) Int. Cl.
*F01L 1/34*    (2006.01)
*F01L 1/24*    (2006.01)
(Continued)

(52) U.S. Cl.
CPC ................. *F01L 1/24* (2013.01); *F01L 1/047* (2013.01); *F01L 1/462* (2013.01); *F01L 9/023* (2013.01);
(Continued)

(58) Field of Classification Search
CPC ... F01L 1/24; F01L 1/047; F01L 1/462; F01L 2001/2444; F01L 9/025; F01L 2800/19; F16H 25/10; F16H 25/14
See application file for complete search history.

(56) References Cited

FOREIGN PATENT DOCUMENTS

DE    102005000621 A1    7/2006
EP    0803642 B1    11/2000
(Continued)

OTHER PUBLICATIONS

European Search Report for European Application No. 15200888.4, dated Jun. 16, 2016.

*Primary Examiner* — Zelalem Eshete
(74) *Attorney, Agent, or Firm* — Heslin Rothenberg Farley & Mesiti P.C; Victor A. Cardona, Esq.

(57) ABSTRACT

A system for variable actuation of an engine valve of an engine includes a master piston driven by a cam of a camshaft. A slave piston is driven by the master piston by a volume of pressurized fluid. The slave piston causes the engine valve to open, against the action of a spring. A control valve controls a communication between pressurized fluid and an environment at lower pressure, with which a fluid accumulator is in communication. A control unit is programmed for controlling the control valve according to one or more different valve modes. When one of these valve modes is actuated, the control valve opens the communication in advance with respect to the end of the lift cycle of the cam, and not after closing of the engine valve to prevent or reduce a decrease in pressure in the volume of pressurized fluid after closing of the engine valve.

3 Claims, 8 Drawing Sheets

(51) Int. Cl.
*F01L 1/047* (2006.01)
*F01L 1/46* (2006.01)
*F16H 25/10* (2006.01)
*F16H 25/14* (2006.01)
*F01L 9/02* (2006.01)

(52) U.S. Cl.
CPC .............. *F01L 9/025* (2013.01); *F16H 25/10* (2013.01); *F16H 25/14* (2013.01); *F01L 2001/2444* (2013.01); *F01L 2800/19* (2013.01)

(56) References Cited

FOREIGN PATENT DOCUMENTS

| | | |
|---|---|---|
| EP | 1091097 A1 | 4/2001 |
| EP | 1243761 A1 | 9/2002 |
| EP | 1344900 A2 | 9/2003 |
| EP | 1555398 A1 | 7/2005 |
| EP | 1635045 A1 | 3/2006 |
| EP | 1726790 A1 | 11/2006 |
| EP | 1674673 B1 | 3/2007 |
| EP | 1508676 B1 | 2/2008 |
| EP | 2597276 A1 | 5/2013 |
| EP | 2801706 A1 | 11/2014 |
| EP | 2806195 A1 | 11/2014 |

Prior art

Prior art

Prior art

SYSTEM AND METHOD FOR VARIABLE ACTUATION OF A VALVE OF AN INTERNALCOMBUSTION ENGINE, WITH AN ELECTRICALLY OPERATED CONTROL VALVE HAVING AN IMPROVED CONTROL

CROSS REFERENCE TO RELATED APPLICATIONS

This application claims priority from European Patent Application No. 15200888.4 filed on Dec. 17, 2015, the entire disclosure of which is incorporated herein by reference.

FIELD OF THE INVENTION

The present invention relates to systems for variable actuation of an engine valve of an internal-combustion engine, of the type comprising:
- a master piston driven directly or indirectly by a cam of a camshaft of the internal-combustion engine;
- a slave piston, which drives said engine valve and is hydraulically driven by said master piston, by means of a volume of pressurized fluid interposed between the master piston and the slave piston,
- said engine valve being recalled by at least one spring into a closed position;
- an electrically operated control valve, which controls a communication between said volume of pressurized fluid and an environment at lower pressure, with which a fluid accumulator is in communication, in such a way that:
- when the electrically operated control valve keeps said communication closed, the engine valve can be driven by said cam, whereas
- when the electrically operated control valve keeps said communication open, fluid can be discharged from the volume of pressurized fluid into the aforesaid environment at lower pressure, so that the engine valve is recalled towards the closed position by said spring, and remains unaffected by the movement of said cam; and
- an electronic control unit for controlling said electrically operated control valve,
- said electronic control unit being programmed for controlling said electrically operated valve in such a way as to actuate the engine valve according to one or more different valve control modes, depending upon operating conditions of the engine, said valve control modes including a late-valve-opening mode, in which opening of the engine valve is delayed with respect to the start of the lift cycle determined by the cam profile, and/or a multilift valve mode, in which the engine valve opens and closes more than once in one and the same lift cycle of the cam, and/or an early-valve-closing (EVC) mode, which consists in anticipated closing of said engine valve.

PRIOR ART

The present applicant has for some time been developing internal-combustion engines provided with a system for variable actuation of the intake valves of the type indicated above, marketed under the trademark "Multiair", which has the characteristics referred to above. The present applicant is the holder of numerous patents and patent applications regarding engines provided with a system of the type specified above and components of this system.

FIG. 1 of the annexed drawings shows a cross-sectional view of a cylinder head of an internal-combustion engine according to the techniques described in the document No. EP 0 803 642 B1. The cylinder head illustrated in FIG. 1 and designated by the reference number 1 is applied to an engine with four cylinders in line; however, the variable-actuation system illustrated therein is of general application. The cylinder head 1 comprises, for each cylinder, a cavity 2, which is formed in the base surface 3 of the cylinder head 1 and defines the combustion chamber. Giving out into the cavity 2 are two intake ducts 4, 5 (the duct 5 is represented with a dashed line) and two exhaust ducts 6 (only one of which is visible in the figure). Communication of the two intake ducts 4, 5 with the combustion chamber 2 is controlled by two intake valves 7 (only one of which is visible in the figure), of the traditional poppet type, each comprising a stem 8 slidably mounted in the body of the cylinder head 1.

Each valve 7 is recalled into the closing position by springs 9 set between an internal surface of the cylinder head 1 and an end valve retainer 10. Communication of the two exhaust ducts 6 with the combustion chamber is controlled by two valves 70 (only one of which is visible in the figure), which are also of a traditional type and associated to which are springs 9 for return towards the closed position.

Opening of each intake valve 7 is controlled, in the way that will be described in what follows, by a camshaft 11, which is rotatably mounted about an axis 12 within supports of the cylinder head 1 and comprises a plurality of cams 14 for actuation of the intake valves 7 of the internal-combustion engine.

Each cam 14 that controls an intake valve 7 co-operates with the plate 15 of a tappet 16 slidably mounted along an axis 17, which, in the case of the example illustrated in the prior document cited, is set substantially at 90° with respect to the axis of the valve 7. The plate 15 is recalled against the cam 14 by a spring associated thereto. The tappet 16 constitutes a pumping plunger, or master piston, slidably mounted within a bushing 18 carried by a body 19 of a pre-assembled unit 20, which incorporates all the electrical and hydraulic devices associated to actuation of the intake valves, according to what is described in detail in what follows. There may be provided a separate unit 20 for each cylinder of the engine.

The master piston 16 is able to transmit a thrust to the stem 8 of the valve 7 so as to cause opening of the latter against the action of the elastic means 9, by means of pressurized fluid (preferably oil coming from the engine-lubrication circuit) present in a volume of pressurized fluid C facing which is the master piston 16, and by means of a slave piston 21 slidably mounted in a cylindrical body constituted by a bushing 22, which is also carried by the body 19 of the pre-assembled unit 20.

Once again with reference to FIG. 1, the volume of pressurized fluid C associated to each intake valve 7 can be set in communication with an environment at lower pressure, constituted by an exhaust channel 23, via a solenoid valve 24. The channel 23 is designed to receive from the engine-lubrication circuit oil supplied by the pump of the lubrication circuit, via a duct arranged in which are one or more bleeding siphons and a non-return valve (see in this connection, for example, EP-A-1 243 761 and EP-A-1 555 398 filed in the name of the present applicant).

The solenoid valve 24, which may be of any known type, suitable for the purpose illustrated herein, is controlled by electronic control means 25, as a function of signals S indicating operating parameters of the engine, such as the position of the accelerator and the engine r.p.m. or the temperature or viscosity of the oil in the system for variable actuation of the valves.

When the solenoid of the solenoid valve 24 is energized, the solenoid valve is closed so as to maintain the volume of fluid C under pressure and enable actuation of each intake valve 7 by the respective cam 14, via the master piston 16, the slave piston 21, and the volume of oil comprised between them.

When the solenoid of the solenoid valve 24 is de-energized, the solenoid valve opens so that the volume C enters into communication with the channel 23, and the pressurized fluid present in the volume C flows into this channel. Consequently, a decoupling is obtained of the cam 14 and of the master piston 16 from the intake valve 7, which thus returns rapidly into its closing position under the action of the return springs 9.

By controlling the communication between the volume C and the exhaust channel 23, it is consequently possible to vary the instant of opening and/or the instant of closing and stroke of opening of each intake valve 7.

The exhaust channels 23 of the various solenoid valves 24 all give out into one and the same longitudinal channel 26 communicating with pressure accumulators 27, only one of which is visible in FIG. 1. Each accumulator is substantially constituted by a cylindrical body slidably mounted within which is a plunger defining a chamber of the accumulator, which communicates with the low-pressure environment defined by the exhaust channels 23, 26. A helical spring within the accumulator recalls the plunger of the accumulator into a position in which the volume for receiving the fluid within the accumulator is minimum. If the solenoid valve 24 is opened at an instant when the master piston 16 is in the process of compressing of the fluid present in the volume C, part of the pressurized fluid present in the volume C flows towards the accumulator 270.

The master piston 16 with the associated bushing 18, the slave piston 21 with the associated bushing 22, the solenoid valve 24, and the channels 23, 26 are carried by or formed in the aforesaid body 19 of the pre-assembled unit 20, to the advantage of rapidity and ease of assembly of the engine.

In the example illustrated, the exhaust valves 70 associated to each cylinder are controlled in a traditional way, by a respective camshaft 28, via respective tappets 29, even though in principle there is not excluded application of the variable-actuation system also to the exhaust valves. This applies also to the present invention.

Once again with reference to FIG. 1, the variable-volume chamber defined inside the bushing 22 and facing the slave piston 21 (which in FIG. 1 is illustrated in its condition of minimum volume, given that the slave piston 21 is at its top dead centre) communicates with the pressurized-fluid chamber C via an opening 30 made in an end wall of the bushing 22. This opening 30 is engaged by an end nose 31 of the plunger 21 in such a way as to provide hydraulic braking of the movement of the valve 7 in the closing phase, when the valve is close to the closing position, in so far as the oil present in the variable-volume chamber is forced to flow into the volume of pressurized fluid C passing through the clearance existing between the end nose 31 and the wall of the opening 30 engaged thereby. In addition to the communication constituted by the opening 30, the volume of pressurized fluid C and the variable-volume chamber of the slave piston 21 communicate with one another via internal passages made in the body the slave piston 21 and controlled by a non-return valve 32, which enables passage of fluid only from the pressurized volume C to the variable-volume chamber of the slave piston 21. Various alternative embodiments of the hydraulic-braking device of the slave piston 21 have been proposed in the past by the present applicant (see, for example, EP-A-1 091 097 and EP-A-1 344 900). The purpose of the hydraulic-braking device is to prevent a sharp impact (and consequent noise) of the valve 7 against its seat when the valve 7 returns rapidly into the closing position following upon opening of the solenoid valve 24.

During normal operation of the known engine illustrated in FIG. 1, when the solenoid valve 24 excludes communication of the volume of pressurized fluid C with the exhaust channel 23, the oil present in the volume C transmits the movement of the master piston 16, imparted by the cam 14, to the slave piston 21, which drives opening of the valve 7. In the reverse movement of closing of the engine valve, as has already been said, during the final step the nose 31 enters the opening 30 causing hydraulic braking of the valve so as to prevent impact of the body of the valve against its seat, for example following upon an opening of the solenoid valve 24 that brings about immediate return of the valve 7 into the closing position.

In the system described, when the solenoid valve 24 is activated, the engine valve follows the movement of the cam (full lift). An anticipated closing of the engine valve can be obtained by opening the solenoid valve 24 so as to empty out the volume of pressurized fluid C and obtain closing of the valve 7 under the action of the respective return springs 9. Likewise, a delayed opening of the valve can be obtained by delaying closing of the solenoid valve, whereas the combination of a delayed opening and an anticipated closing of the valve can be obtained by closing and opening the solenoid valve during the thrust of the corresponding cam. According to an alternative strategy, in line with the teachings of the patent application No. EP 1 726 790 A1 filed in the name of the present applicant, each intake valve can be controlled in multilift mode, i.e., according to two or more repeated "subcycles" of opening and closing. In each subcycle, the intake valve opens and then closes completely. The electronic control unit is consequently able to obtain a variation of the instant of opening and/or of the instant of closing and/or of the lift of the intake valve, as a function of one or more operating parameters of the engine. This enables the maximum engine efficiency to be obtained, and the lowest fuel consumption, in every operating condition.

FIG. 2 of the annexed drawings corresponds to FIG. 6 of the document No. EP 1 674 673 filed in the name of the present applicant and shows the scheme of the system for actuation of the two intake valves associated to each cylinder, in a conventional Multiair system. This figure shows two intake valves 7 associated to one and the same cylinder of an internal-combustion engine, which are controlled by a single master piston 16, which is in turn controlled by a single cam of the engine camshaft (not illustrated) acting against a plate 15. FIG. 2 does not illustrate the return springs 9 (see FIG. 1) that are associated to the valves 7 and tend to bring them back into the respective closing positions. As may be seen, in the conventional system of FIG. 2, a single master piston 16 controls the two intake valves 7 via a single volume of pressurized fluid C, communication of which with the exhaust is controlled by a single solenoid valve 24. The volume of pressurized fluid C is in hydraulic communication with both of the variable-volume chambers C1, C2 facing two slave pistons 21 for control of the intake valves 7 of one and the same cylinder.

The system of FIG. 2 is able to operate in an efficient and reliable way above all in the case where the volumes of the hydraulic chambers are relatively small. This possibility is afforded by adopting hydraulic tappets 400 on the outside of the bushings 22, according to what has already been illustrated in detail, for example, in the document No. EP 1 674 673 B1 filed in the name of the present applicant. In this way, the bushings 22 may have an internal diameter that can be chosen as small as desired.

FIG. 3 of the annexed drawings is a schematic representation of the system illustrated in FIG. 2, in which it is evident that both of the intake valves 7 associated to each cylinder of the engine have the hydraulic chambers of the two slave pistons 21 permanently in communication with the pressurized volume C, which in turn may be isolated or connected to the exhaust channel 23, via the single solenoid valve 24.

The solution illustrated in FIGS. 2 and 3 enables obvious advantages as regards simplicity and economy of construction, and from the standpoint of reduction of the overall dimensions, as compared to the solution illustrated, for example, in the document EP 0 803 642 B1, which envisages two solenoid valves for controlling separately the two intake valves of each cylinder.

On the other hand, the solution with a single solenoid valve per cylinder rules out the possibility of differentiating control of the intake valves of each cylinder. This differentiation is, instead, desired, in particular in the case of diesel engines where each cylinder is provided with two intake valves associated to respective intake ducts having conformations different from one another in order to generate different movements of the flow of air introduced into the cylinder (see, for example, FIG. 5 of EP 1 508 676 B1). Typically, in these engines the two intake ducts of each cylinder are shaped for optimizing one the flow of a "TUMBLE" type and the other the flow of a "SWIRL" type inside the cylinder, these motions being fundamental for optimal distribution of the charge of air within the cylinder, substantially depending upon which is the possibility of reducing the pollutant emissions at the exhaust.

In order to solve the above problem, the present applicant has also proposed the use of a different system layout, which makes use of a three-position and three-way solenoid valve, as described for example in EP 2 597 276 A1 filed in the name of the present applicant.

Once again with reference to the known systems to which the present invention can be applied, the present applicant has proposed in the past also alternative solutions for the electrically operated control valve 24, which may be, instead of a solenoid valve, an electrically operated valve of any other type, for example a valve with a piezoelectric actuator or a magnetostrictive actuator (EP 2 806 195 A1).

For the purposes of application of the present invention, all the variants described above may likewise be adopted.

FIG. 3A of the annexed drawings shows a perspective view of the main components of a known embodiment of the Multiair system of the present applicant (the components associated to one cylinder of the engine are shown), corresponding to the general scheme of FIGS. 2 and 3 of the annexed drawings. In FIG. 3A, the parts corresponding to those of FIGS. 1-3 are designated by the same reference numbers.

In the case of the embodiment of FIG. 3A, the master piston 16 is driven by the respective cam 14 via a rocker 140 having an intermediate portion carrying a freely rotatable roller 141 engaging with the cam 14. The rocker 140 has one end rotatably supported by a supporting element 142 mounted in the pre-assembled unit 20. The opposite end of the rocker 140 engages with the plate 15 of the master piston 16. FIG. 3A does not show the spring that recalls the plate 15 against the cam 14. FIG. 3A shows the communications of the high-pressure volume C with the solenoid valve 24 and the solenoid valve 24 with the chambers associated to the two slave pistons 21.

FIG. 4 of the annexed drawings is a further simplified schematic view of a system for variable actuation of an engine valve of the type to which the present invention refers. In this figure, the parts corresponding to those of FIGS. 1-3 and 3A are designated by the same reference numbers.

FIG. 4 shows an engine valve 7 recalled towards a closing condition, against a valve seat 7a, by a spring 9. The valve 7 can be operated by the slave piston 21 under the thrust of the master piston 16, via interposition of the fluid in the volume of pressurized fluid C. The master piston 16 is rigidly connected to a plate 15 that is in sliding contact with the cam 14 and that is recalled against the cam 14 by a spring 15a. The valve 7 can be driven by the cam 14 when the solenoid valve 24 keeps closed the communication between the volume of pressurized fluid C and the volume at lower pressure 23, which is in communication with the fluid accumulator 270.

FIG. 4 also shows the supply line 230 that is designed to supply the fluid, specifically engine-lubricating oil, coming from the engine-lubricating circuit, via a supply pump (not visible in the drawing). Inserted in the supply line 230 is a non-return valve 231, which enables the flow only in the direction of the channel 23 that communicates with the fluid accumulator 270. Moreover inserted in the line 230 are one or more siphon devices (not illustrated), for bleeding off the air, according to what is illustrated, for example, in the documents Nos. EP-A-1 243 761 and EP-A-1 555 398 filed in the name of the present applicant.

With reference once again to the characteristics of the known system already manufactured by the present applicant, which may also be used in the framework of the present invention, it should be noted that between the slave piston 21 and the stem of the engine valve 7 there can be set a hydraulic lash-compensation device (or "lash adjuster"). This solution is, for example, described in the document No. EP-A-1 635 045 filed in the name of the present applicant.

In the aforesaid known systems, the electronic control unit 25 is programmed for implementing different modes of operation of an engine valve (in the example illustrated in FIGS. 1-3 and 3A, an engine intake valve) as a function of the operating conditions of the engine.

FIG. 5 of the annexed drawings shows schematically four different valve modes with which an engine valve can be actuated. In this figure, the different valve modes are illustrated by means of diagrams that show the lift of the engine valve as a function of the crank angle.

The full-lift (FL) mode is the one in which the control valve 24 keeps the passage of communication between the volume of pressurized fluid C and the environment at lower pressure 23 closed throughout the active cycle of the cam 14 in which the part of the cam profile that exceeds the circular base profile is in contact with the plate 15 (see FIG. 4), in such a way as to tend to keep the valve 7 open. In the FL mode, the lift profile of the valve 7 hence corresponds to the lift profile of the cam 14, but for a multiplicative factor that depends upon the ratio between the diameter of the master piston 16 and the diameter of the slave piston 21. Moreover, for reasons of simplicity, the volume of fluid that might seep through the dynamic seals of the various couplings is neglected.

The early-valve-closing (EVC) mode envisages that the solenoid valve 24 keeps closed the passage of communication between the volume of pressurized fluid C and the environment at lower pressure 23 at the start of the lift cycle of the cam 14, so that a first part of the lift profile of the engine valve corresponds to the first part of the lift profile of the cam 14. However, in this mode, the valve 24 opens the aforesaid communication before the lift cycle of the cam 14 has terminated. When the communication opens, pressurized fluid flows from the chamber C to the environment at lower pressure 23, and the valve 7 closes rapidly, under the action of the return spring 9, even though the cam 14 is still in a position in which it would tend to keep the valve open. Consequently, the lift profile of the valve 7, in the EVC mode, follows the curve indicated by the solid line, instead of the profile with a dashed line corresponding to the cam profile. In this operating mode, the engine valve 7 hence reaches the closed condition in advance with respect to the instant of closing in the FL mode.

Once again with reference to FIG. 5, the late-valve-opening (LVO) mode envisages that at the start of the lift cycle of the cam 14 the control valve 24 keeps open the communication between the volume C and the environment at lower pressure 23. Consequently, in the case where the cam 14 would tend to open the valve 7, the latter instead remains closed, since the fluid displaced by the master piston 16 can discharge into the environment at lower pressure 23 and into the fluid accumulator 270. In the LVO mode, the control valve 24 closes the passage of communication between the volume C and the environment at lower pressure 23 at an instant subsequent to start of the lift cycle of the cam 14. Starting from this instant, the valve 7 can be controlled by the cam 14. However, in this case, the valve 7 has a lift profile that is reduced as compared to that of the conventional cycle, in so far as it starts to open when the master piston 16 has already completed a first part of its stroke under the thrust of the cam 14. Consequently, in the LVO mode the valve 7 returns into the closed position at an instant anticipated as compared to the conventional cycle corresponding to the cam profile (represented with a dashed line in the LVO diagram).

A further valve mode, the multilift (ML) mode, envisages that the control valve 24 closes and opens the aforesaid communication a number of times within one and the same lift cycle of the cam 14, in such a way that the valve 7 opens and closes completely twice or more times within one and the same lift cycle of the cam. Also in this mode, as in the LVO mode, it may happen that the valve 7 closes in advance with respect to closing of the conventional cycle corresponding to the cam profile, even if the control valve 24 keeps closed the communication between the volume C and the environment at lower pressure 23.

TECHNICAL PROBLEM

Studies and experiments conducted by the present applicant have shown a possible drawback of the known system in the case of the LVO and ML modes illustrated in FIG. 5. This drawback is hereinafter described specifically with reference to the LVO mode.

FIG. 6 of the annexed drawings shows again with a dashed line the conventional lift profile corresponding to the cam profile and with a solid line the lift profile of the engine valve in the LVO mode. FIG. 6 moreover shows the signal of the current "i" supplied to the solenoid of the solenoid valve 24, according to the known solution already proposed by the present applicant, which has been described above.

FIG. 6 regards the case where the control valve 24 is a normally open solenoid valve. The solenoid of the valve 24 is supplied with electric current when it is desired to close the passage of communication between the volume of pressurized fluid C and the environment at lower pressure 23.

As may be seen in FIG. 6, the solenoid of the valve 24 is energized at a crank angle $\alpha 1$ subsequent to the crank angle $\alpha 0$ where the cam 14 would start to drive opening of the engine valve 7. Consequently, a first part of the movement of the master piston 16 caused by the cam 14 does not bring about a corresponding lift of the valve 7, in so far as the communication between the volume C and the environment at lower pressure 23 is still open. Starting from the crank angle $\alpha 1$, the aforesaid communication is closed, so that the valve 7 performs a cycle of opening and subsequent closing, as a result of the residual portion of the profile of the cam 14. Consequently, the engine valve 7 returns into the closed position at a crank angle $\alpha 2$ that precedes the angle $\alpha 4$, where the conventional cycle of opening of the engine valve, corresponding to the profile of the cam 14, terminates. According to the prior art, the supply of current to the solenoid is interrupted at the angle $\alpha 3$, i.e., just before the angle $\alpha 4$, in order to prevent any waste of current in the phase where the plate 15 of the master piston 16 is in sliding contact with the circular base profile of the cam 14.

As a result of the operation described above, the known solution presents the drawback that, following upon closing of the engine valve 7 at the angle $\alpha 2$, the communication between the volume C and the environment at lower pressure 23 remains interrupted for a certain angular range, during which the master piston 16 performs again a residual stroke upwards (as viewed in FIG. 4), whereas the slave piston 21 is already in its top end-of-travel position, in the direction of an increase of the volume C, corresponding to the closed condition of the engine valve 7. Consequently, in this step, the volume C remains isolated from the environment at lower pressure 23 and at the same time increases in size, thus determining a reduction in the pressure of the residual fluid contained therein. The pressure in the volume C during this step can go to zero or in any case drop below the value of pressure in the environment 23.

In the aforesaid condition, when at the crank angle $\alpha 3$ the communication between the volume C and the environment 23 is re-opened, the lower level of pressure in the volume C as compared to that in the environment 23 bring about a flow of fluid from the environment 23 to the volume C. This flow, which is opposite to the flow that normally arises after opening of the control valve 24, gives rise to problems of cavitation and consequently to noise and vibrations.

Furthermore, when following upon the aforesaid reverse flow a balance is reached between the pressure in the volume 23 and in the accumulator 270 and the pressure in the volume C, there occurs a hammer due to the inertia of the aforesaid reverse flow that is suddenly stopped.

The same problem arises of course also in the multilift valve mode (ML in FIG. 5) and could arise also in conditions of full-lift mode, especially at low engine r.p.m. and at high temperature, when the oil has minimal viscosity and the volume of oil that seeps through the various dynamic seals may be significant.

Attempts to overcome the aforesaid problem by means of an acoustic and mechanical isolation of the system have proven unfruitful, both in so far as they are excessively costly and in so far as they have not solved the problem of cavitation.

Further attempts at preventing the aforesaid reverse flow by means of a reduction of the operating pressure of the fluid accumulator 270 have given rise to the disadvantage of a more difficult filling of the volume C at high engine r.p.m., when the control valve 24 is opened to enable opening of the engine valve as a result of the movement of the cam.

A system according to the preamble of claim 1 is also known from DE 10 2005 000621 A1.

OBJECT OF THE INVENTION

The object of the present invention is to provide a system for variable actuation of the valves of an internal-combustion engine that will be able to overcome the drawback indicated above.

A further object of the invention is to achieve the above purpose by pre-arranging of means that are simple, low-cost, and safe and reliable in operation.

SUMMARY OF THE INVENTION

With a view to achieving the aforesaid objects, the subject of the present invention is a system for variable actuation of an engine valve of an internal-combustion engine having all the characteristics that have been indicated at the start of the present description and moreover characterized in that the aforesaid electronic control unit is programmed in such a way that, when the aforesaid late-valve-opening mode is actuated or when the aforesaid multilift mode is actuated, the control valve opens the aforesaid communication in advance with respect to the end of the lift cycle of the cam, and not after closing of the engine valve, in such a way as to prevent or at least reduce a decrease of the pressure in the volume of pressurized fluid following upon closing of the engine valve.

In a preferred embodiment, in the aforesaid late-valve-opening mode and in the aforesaid multilift mode, the electronic control unit is programmed in such a way that the control valve opens the aforesaid communication substantially in the proximity of the instant when the engine valve closes.

The electronic control unit knows, in each operating condition of the engine, the instant of closing of the engine valve and is consequently able to drive opening of the control valve substantially in the proximity of closing of the engine valve.

In the case where the control valve is a normally open solenoid valve, where the solenoid of the control valve is supplied with electric current to bring about closing of the passage of communication between the volume of pressurized fluid and the environment at lower pressure, interruption ("switch-off") of the current for supply of the solenoid is carried out, in the LVO mode, in the ML mode, and if necessary also in full-lift mode, substantially upon closing of the engine valve.

In a variant, the electronic control unit is programmed in such a way that the control valve opens the aforesaid communication in advance with respect to the instant when the engine valve closes.

A further subject of the present invention is a method for variable actuation of an engine valve of an internal-combustion engine having the characteristics specified in the annexed claim 7.

In the system and in the method according to the invention, the control valve re-establishes the communication between the volume of pressurized fluid and the environment at lower pressure before the pressure in the volume of pressurized fluid can drop significantly on account of a residual movement of return of the master piston when the slave piston is already in its end-of-travel position corresponding to the closed position of the engine valve. Consequently, in the system and in the method according to the invention, when the communication is opened, the pressure differential between the two environments separated by the control valve is minimal, so that the problems discussed above linked to cavitation and hammer are reduced to a minimum or even eliminated altogether.

BRIEF DESCRIPTION OF THE DRAWINGS

Further characteristics and advantages of the invention will emerge from the ensuing description with reference to the annexed drawings, which are provided purely by way of non-limiting example and in which.

DETAILED DESCRIPTION OF SOME PREFERRED EMBODIMENTS

FIGS. 1-3, 3A and 4-6 which regard the prior art, have already been described above.

Figure 1:
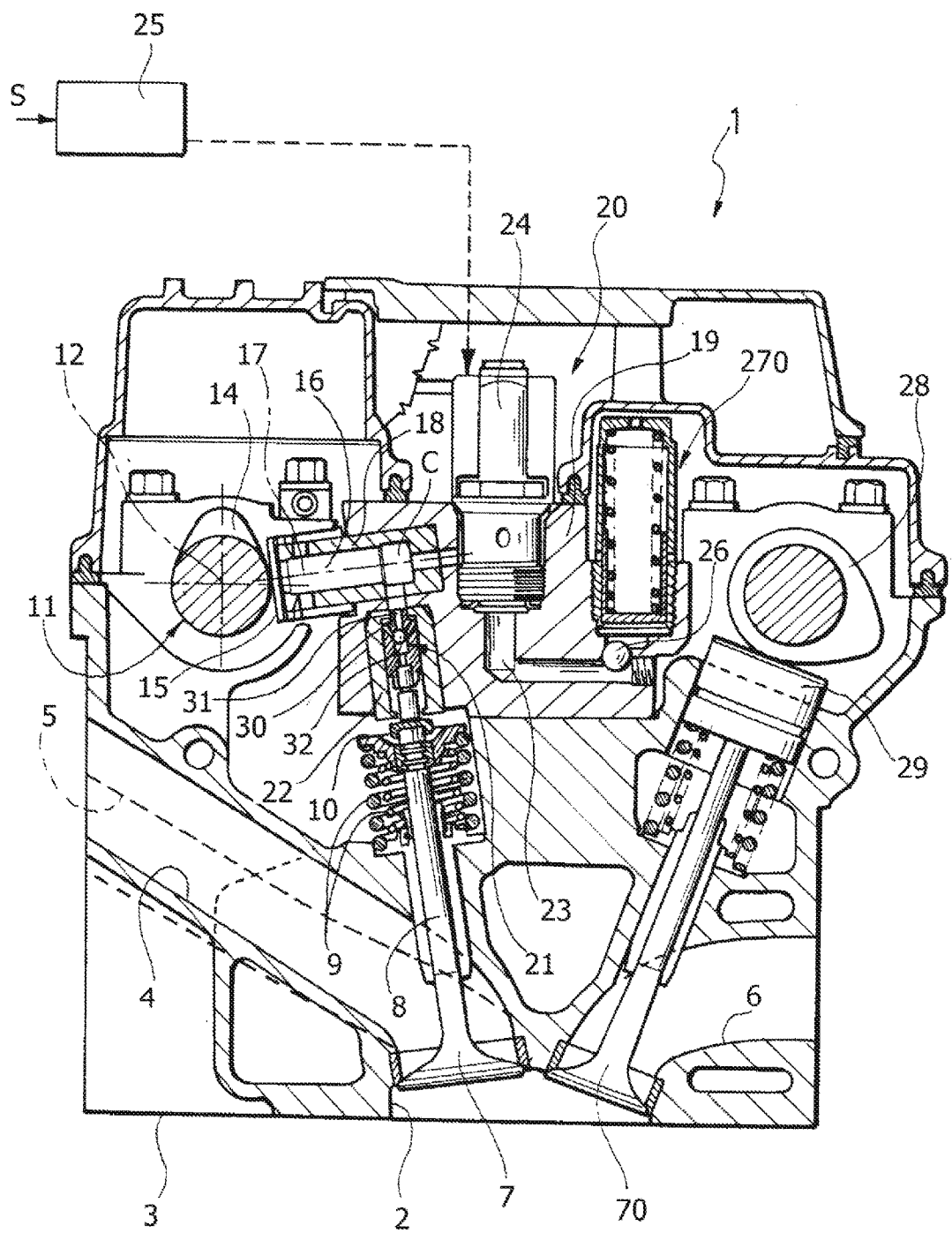
FIG. 1 is a cross-sectional view of a cylinder head of an internal-combustion engine provided with a system for variable actuation of the intake valves according to the prior art.
Figure 2:
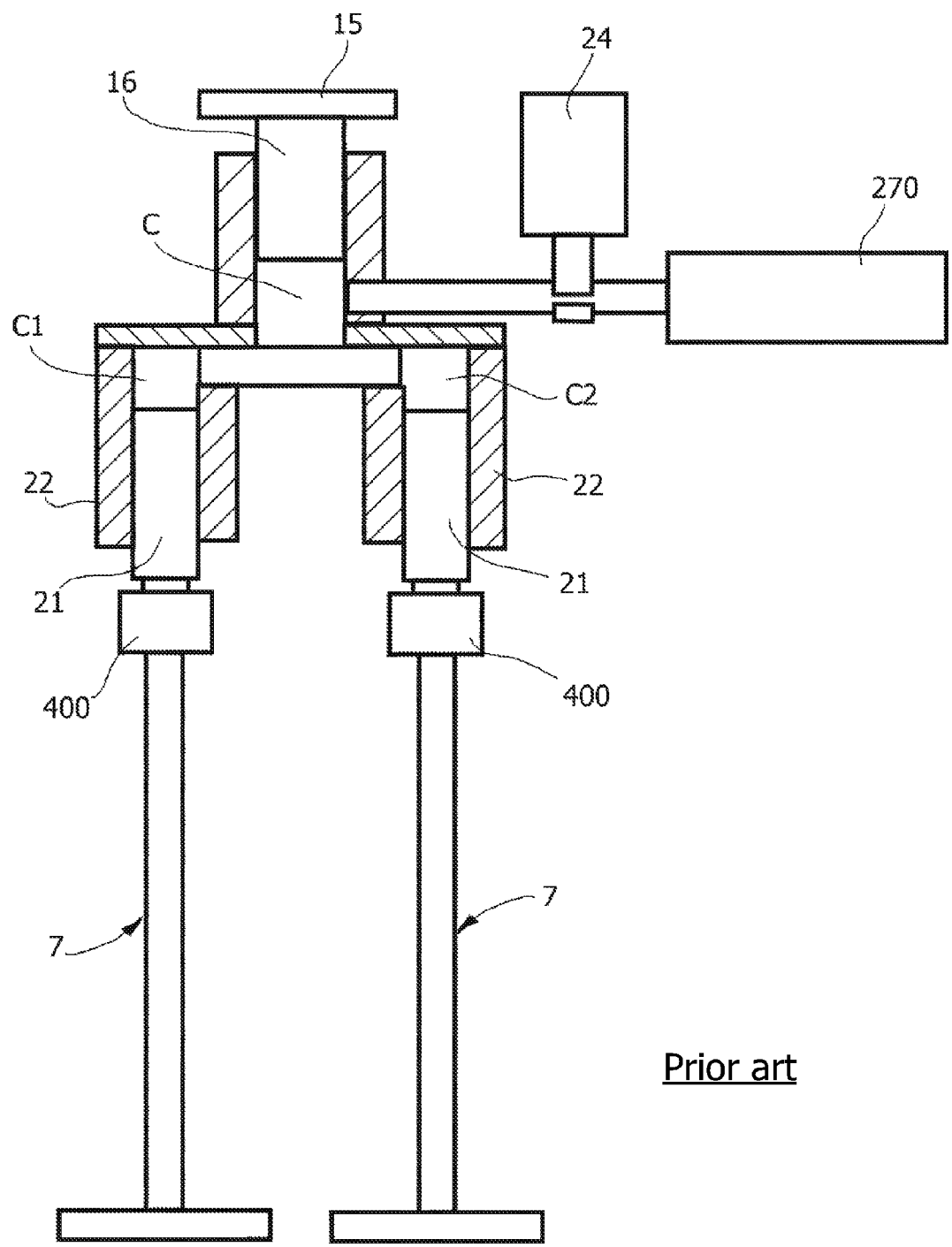
FIG. 2 is a diagram of a system for variable actuation of the valves of an internal-combustion engine according to the prior art.
Figure 3:
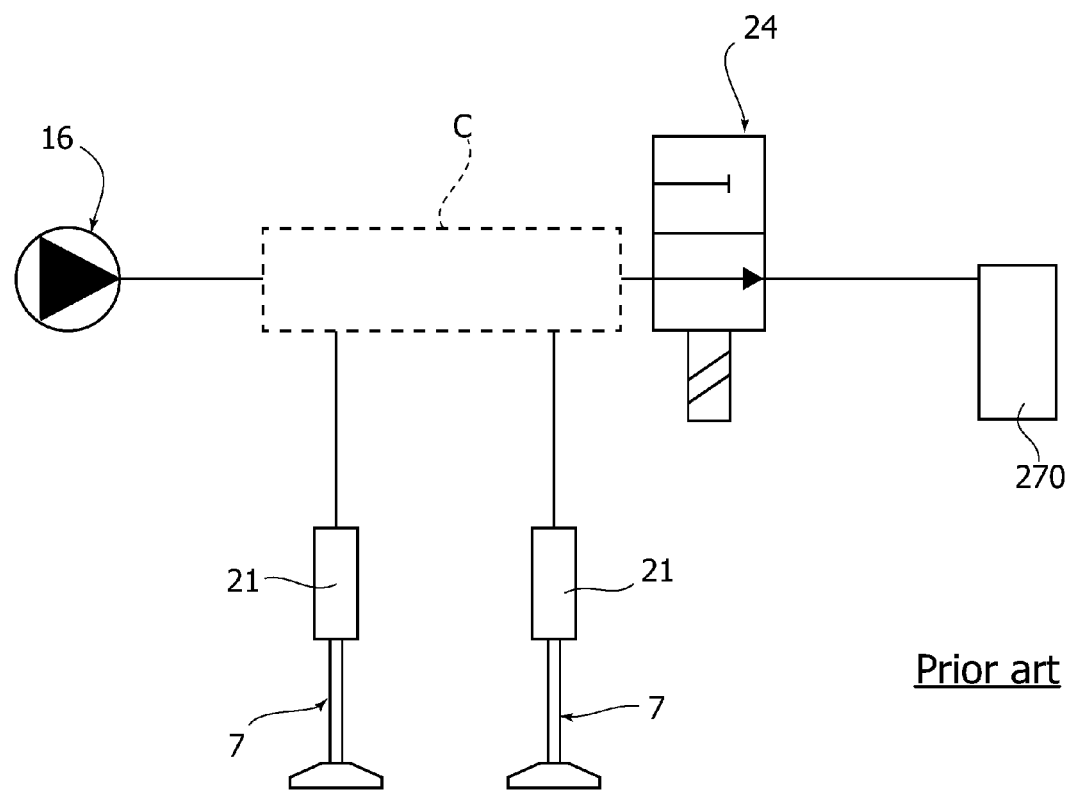
FIG. 3 is a further diagram of the system of FIG. 2.
Figure 3A:
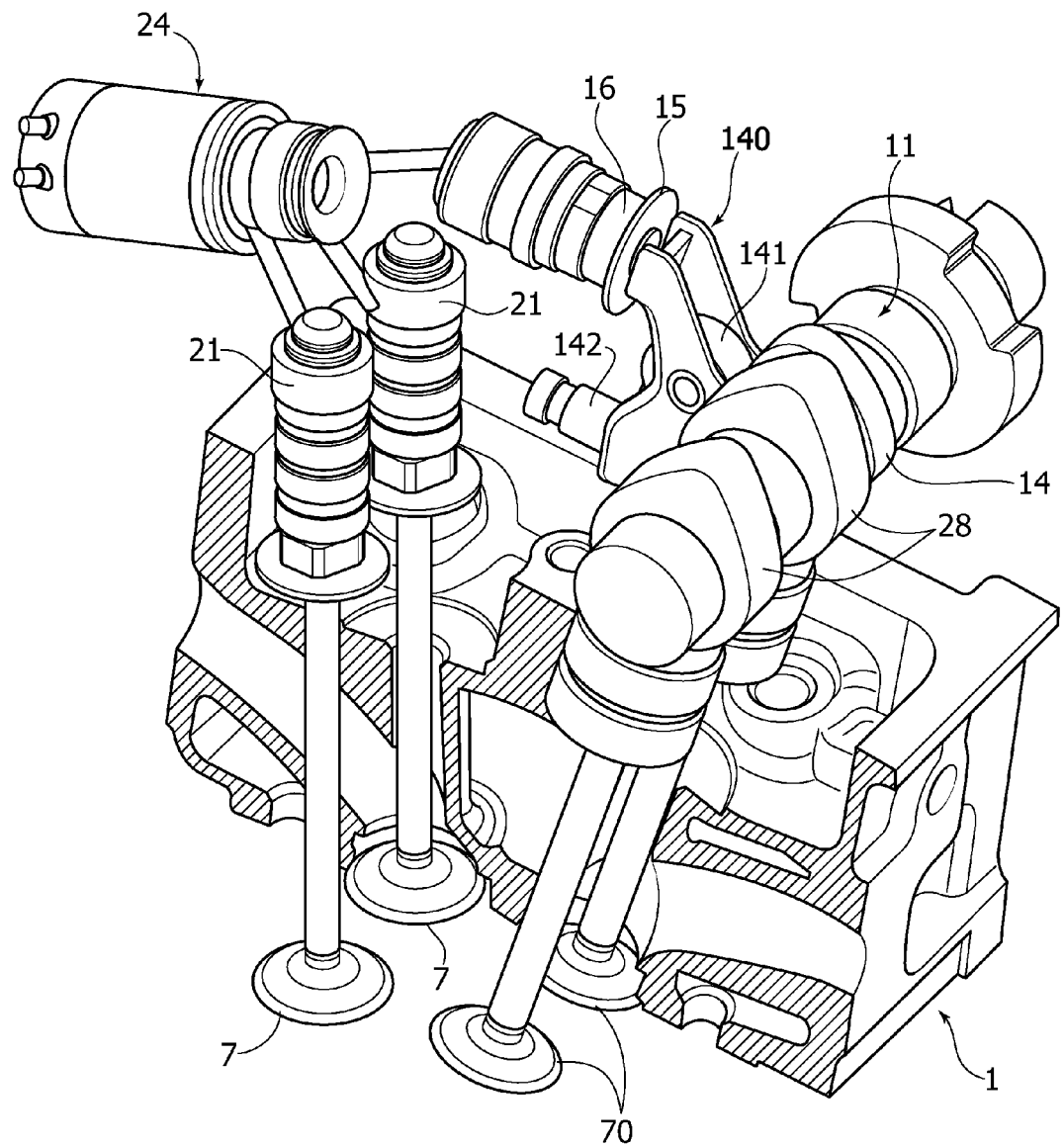
FIG. 3A is a perspective view of an embodiment of the known system according to the prior art.
Figure 4:
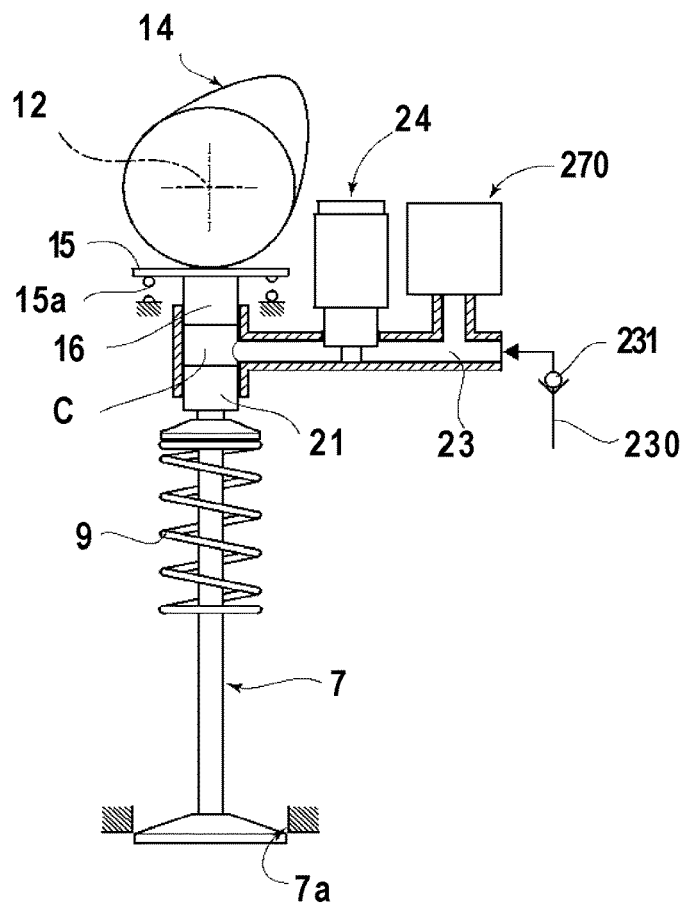
FIG. 4 is a further schematic view of the system according to the prior art.
Figure 5:
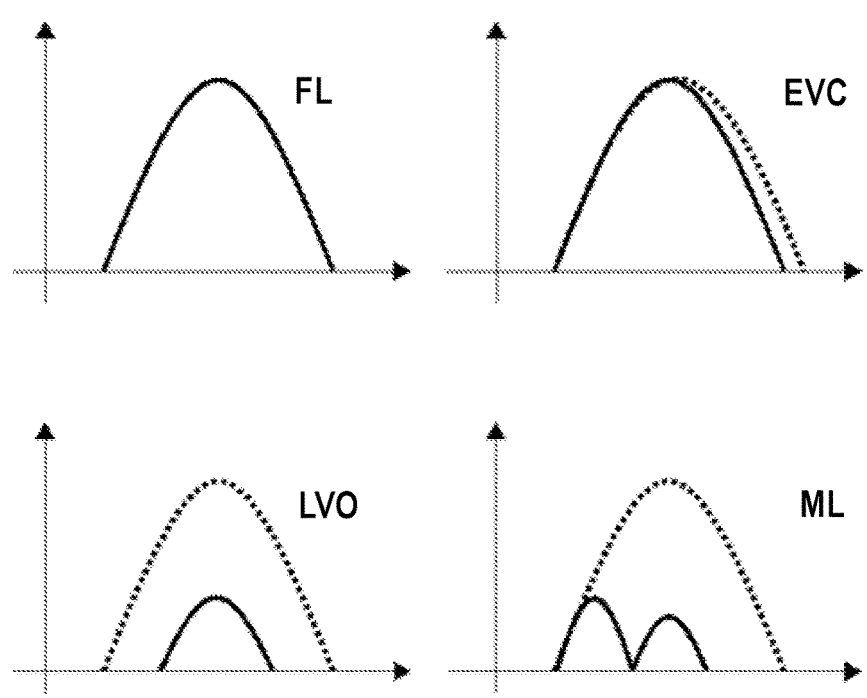
FIG. 5 illustrates four different diagrams of lift of the engine valve, corresponding to different valve modes that can be obtained with the system according to the prior art.
Figure 6:
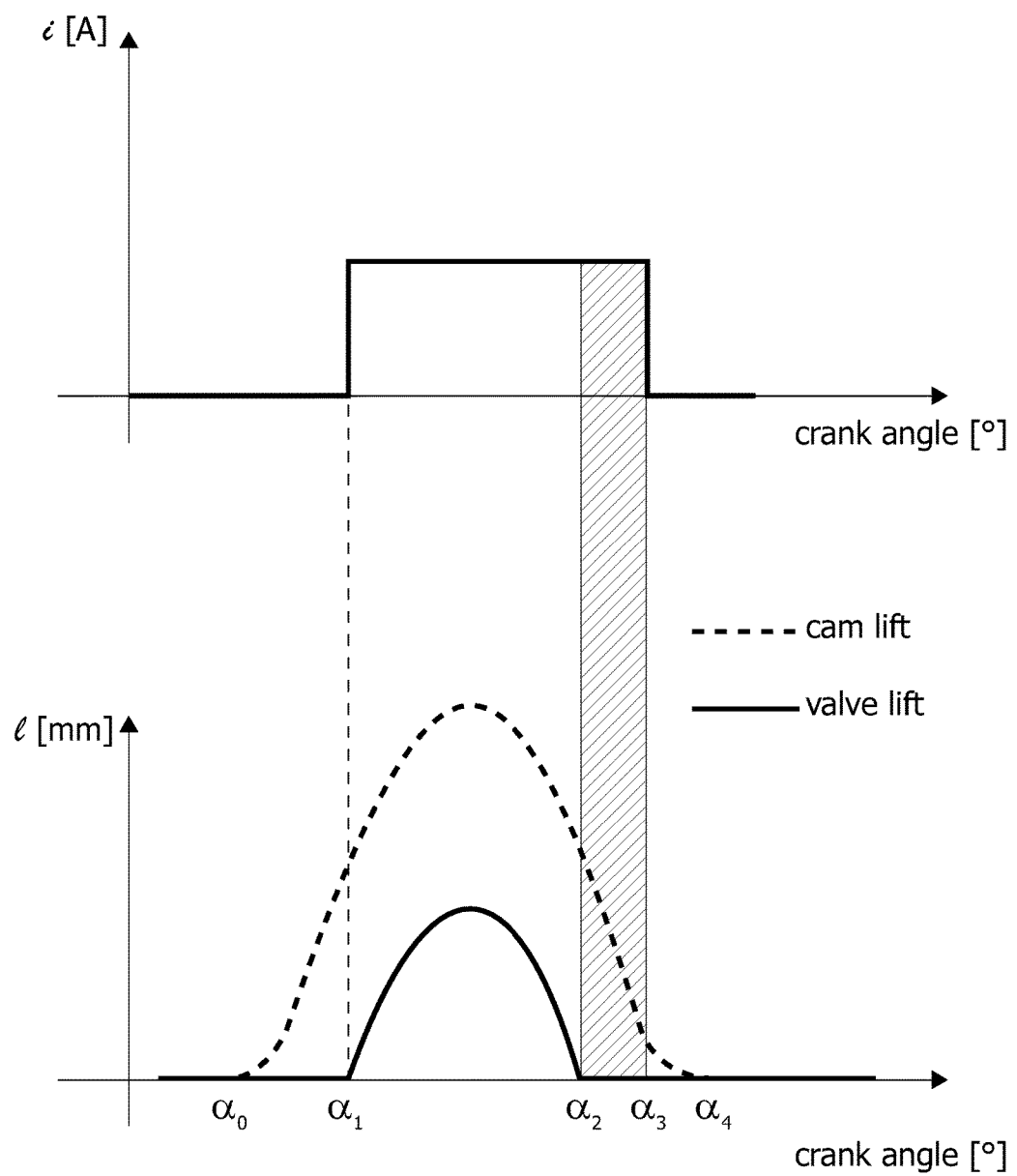
FIG. 6 is a further diagram that shows the late-valve-opening (LVO) mode in association with the corresponding profile of the current for supply of the solenoid of the control valve of the system, according to the prior art.
Figure 7:
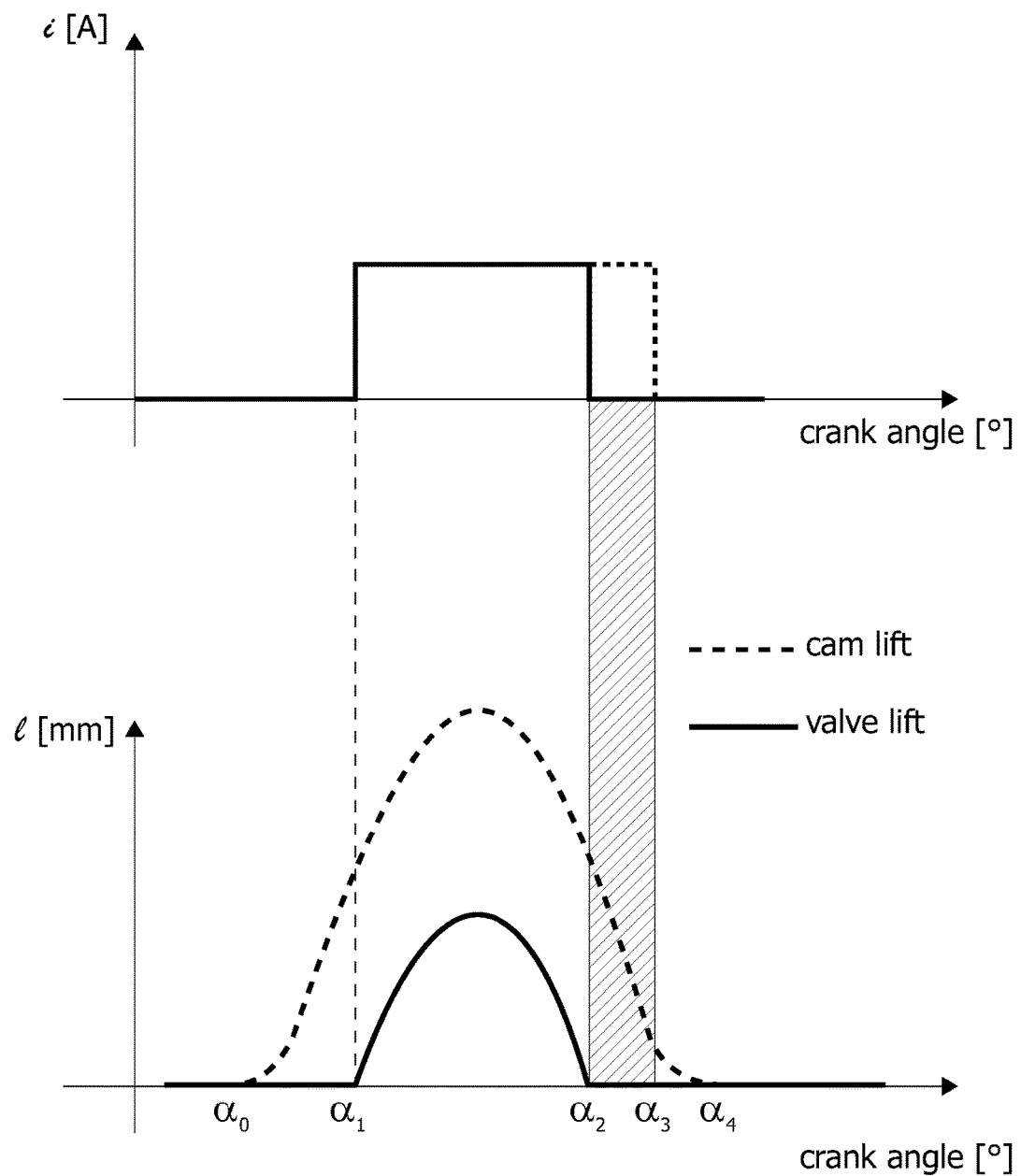
FIG. 7 is a variant of the diagram of FIG. 6 that shows the main characteristic of the system and of the method according to the invention.

FIG. 7 of the annexed drawings is obtained starting from FIG. 6 and shows the differences of the invention as compared to the prior art.

FIG. 7 refers by way of example to the case where the electronic control unit 25 governs the control valve 24 so as to implement the LVO mode, with delayed opening of the engine valve 7, according to what has already been described above with reference to FIG. 6.

In FIG. 7, the elements common to those of FIG. 6 are designated by the same references.

As may be seen in FIG. 7, the main difference with respect to FIG. 6 lies in the fact that in the case of the present invention the interruption of supply of current to the solenoid of the solenoid valve 24 (switch-off) is carried out in advance with respect to the crank angle $\alpha a$ corresponding to the end of the lift cycle of the cam, and not after the crank angle $\alpha 2$ corresponding to closing of the engine valve 7. Thanks to this advance of switch-off of the control valve 24, it is possible to prevent an excessive pressure reduction in the volume of pressurized fluid from occurring on account of the residual movement of return of the master piston 16 that takes place after the slave piston 21 has reached its end-of-travel position corresponding to closing of the engine valve 7.

In the example illustrated in FIG. 7, the advance is such that switch-off occurs at an angle substantially corresponding to the crank angle α2 where closing of the engine valve occurs.

In a variant, switch-off can occur also before the angle α2, i.e., before the angle at which the engine valve would close as a result of the action of the cam. In this case, anticipated switch-off would cause an effective closing of the engine valve in advance with respect to the angle α2. Once again in this variant, in the case where it is, however, desired to keep the amount of air introduced into the engine cylinder unaltered with respect to the case where the valve 7 closes at the angle α2, it is possible to modify the profile of the supply current of the solenoid of the valve 24 in such a way as to open the engine valve at an angle slightly in advance with respect to the angle α1.

As emerges clearly from the foregoing, in the case of the system and method according to the invention, when the control valve 24 opens communication between the volume C and the environment 23 communicating with the fluid accumulator 270, the engine valve has just closed, or is about to close, so that there is not a phase in which the volume C is still isolated and increases in size, with consequent reduction of the pressure of the fluid present therein. This causes, upon opening of the communication controlled by the valve 24, the pressure in the volume C not to be lower, or to be only slightly lower, than the pressure in the environment 23 communicating with the fluid accumulator 270, which prevents or drastically reduces the reverse flow that has been described above, and the problems of cavitation and hammer deriving therefrom. The vibrations and noise that accompany the known system in the operating conditions described above are thus eliminated.

Of course, even though the example illustrated herein refers to a valve 24 in the form of a solenoid valve of the normally open type, the valve 24 may be constituted by an electrically operated valve of any known type and may also be a normally closed valve, which is energized for opening the communication controlled thereby. In this case, the basic principle of the invention is implemented by controlling the instant of switch-on of the electrically operated valve.

Figure 8:
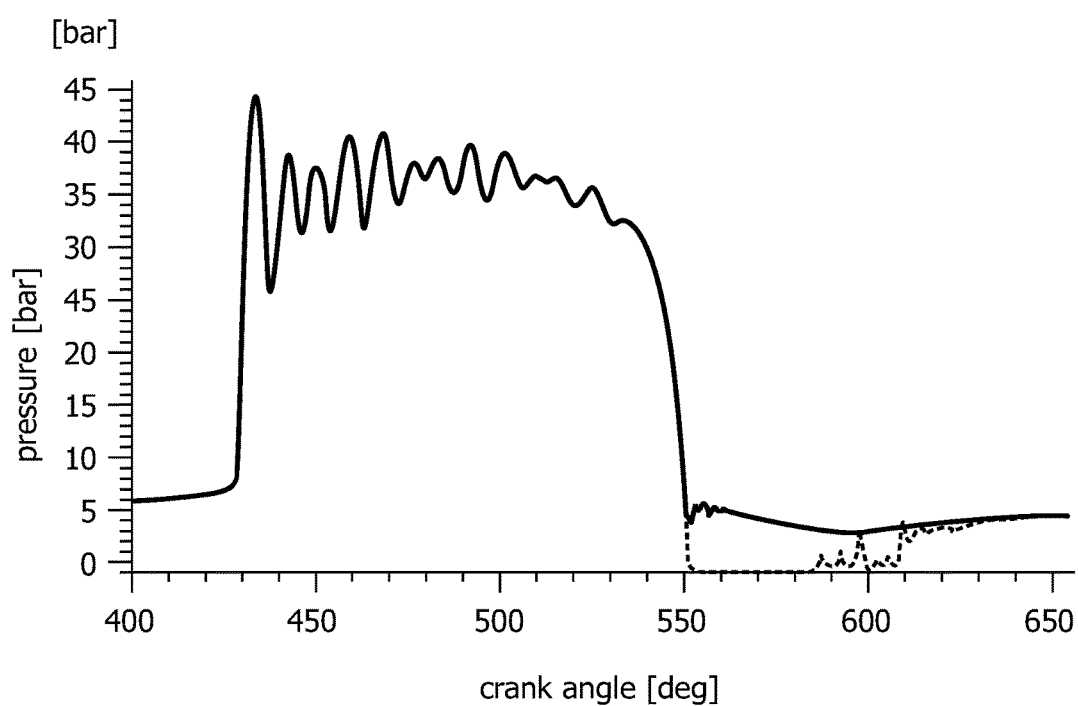
FIG. 8 is a diagram that represents the advantages of the invention.

FIG. 8 is an experimental diagram obtained by the present applicant, which shows the advantages of the invention. This diagram represents the variation of pressure in the volume C as a function of the crank angle. The solid line indicates the variation in the case of the system according to the invention, whereas the dashed line indicates the variation in the case of the solution according to the prior art. As may be seen, in both cases, during one cycle of rotation of the cam, the pressure in the volume of pressurized fluid C presents a cycle of ascent and subsequent descent corresponding to the movement of the master piston caused by the cam. However, in the case of the known solution, during operation in the LVO mode or ML mode, the pressure during descent substantially goes to zero, with subsequent pressure oscillations (at approximately 600° of the crank angle) as a result of the aforesaid reverse flow and of the consequent phenomena of cavitation and hammer. In the case of the invention, instead, the drop in pressure stops at a level higher than the zero value and remains substantially at this level, without any oscillation.

Of course, what has been described above with reference to the LVO mode also applies to a multilift mode, where the last sub-cycle of opening and closing of the valve terminates with closing of the valve in advance with respect to the end of the conventional cycle of lift of the cam.

As emerges clearly from the foregoing description, by the expression "lift cycle of the engine valve" is meant the effective cycle of opening and subsequent closing of the engine valve. By the expression "lift cycle of the cam" is meant the theoretical cycle of opening and subsequent closing of the engine valve that corresponds to the cam profile and that coincides with the real cycle of lift of the engine valve in the full-lift mode, i.e., when the valve 24 keeps the communication controlled thereby closed throughout the step in which the cam causes a movement of the master piston 16.

According to a further characteristic that has already formed the subject of a previous proposal of the present applicant, in the case where the control valve is a normally open solenoid valve, the electronic control unit can be programmed for supplying an electric tail current to the solenoid following upon de-energization thereof in order to brake the movement of the mobile member of the control valve before this reaches its end-of-travel position corresponding to the open condition of the valve.

Of course, without prejudice to the principle of the invention, the embodiments and the details of construction may vary widely with respect to what has described and illustrated herein purely by way of example, without thereby departing from the scope of the present invention.

What is claimed is:

1. A method for variable actuation of an engine valve of an internal-combustion engine, comprising:
    providing a master piston driven directly or indirectly by a cam of a camshaft of the internal-combustion engine;
    providing a slave piston, which drives said engine valve and is hydraulically driven by said master piston, through a volume of pressurized fluid interposed between the master piston and the slave piston,
    said engine valve being recalled by at least one spring into a closed position;
    providing an electrically operated control valve, which controls a communication between said volume of pressurized fluid and an environment at lower pressure, with which a fluid accumulator is in communication, in such a way that:
    when the electrically operated control valve keeps said communication closed, the engine valve can be driven by said cam, whereas
    when the electrically operated control valve keeps said communication open, fluid can be discharged from the volume of pressurized fluid into the aforesaid environment at lower pressure so that the engine valve is recalled into its closed position by said spring, remaining unaffected by the movement of said cam; and
    controlling said electrically operated valve in such a way as to actuate the engine valve according to one or more different valve modes, depending upon operating conditions of the engine, said valve modes including at least one late-valve-opening mode, in which opening of the engine valve is delayed with respect to the start of the lift cycle determined by the cam, or else at least one multilift valve mode, in which the engine valve opens and closes more than once in one and the same lift cycle of the cam,
    wherein when said late-valve-opening mode is actuated or when said multilift valve mode is actuated, the control valve opens the communication in advance with respect to the end of the opening cycle of the cam, and not after closing of the engine valve, in such a way as to prevent or reduce a decrease in pressure in the volume of pressurized fluid after closing of the engine valve.

2. The method according to claim 1, wherein in said late-valve-opening mode or in said multilift valve mode, the control valve opens the communication substantially in the proximity of the instant when the engine valve closes.

3. The method according to claim 1, wherein in said late-valve-opening mode or in said multilift valve mode, the control valve opens the communication in advance with respect to the instant when the engine valve closes.

* * * * *